US008083139B2

(12) United States Patent
Hsieh

(10) Patent No.: US 8,083,139 B2
(45) Date of Patent: Dec. 27, 2011

(54) VOICE DEVICE FOR AUTOMATIC VENDING MACHINE

(75) Inventor: Jyh-Chyang Hsieh, Pate (TW)

(73) Assignee: International Currency Technologies Corporation, Taipei (TW)

( * ) Notice: Subject to any disclaimer, the term of this patent is extended or adjusted under 35 U.S.C. 154(b) by 472 days.

(21) Appl. No.: 12/264,229

(22) Filed: Nov. 3, 2008

(65) Prior Publication Data

US 2010/0108759 A1 May 6, 2010

(51) Int. Cl.
*G06F 7/08* (2006.01)

(52) U.S. Cl. ........................................ 235/381; 235/383

(58) Field of Classification Search .................. 235/381, 235/383; 705/14.14
See application file for complete search history.

(56) References Cited

U.S. PATENT DOCUMENTS

| | | | | |
|---|---|---|---|---|
| 6,264,104 | B1 * | 7/2001 | Jenkins et al. | 235/383 |
| 6,658,323 | B2 * | 12/2003 | Tedesco et al. | 700/236 |
| 2007/0029376 | A1 * | 2/2007 | Stoutenburg et al. | 235/379 |
| 2007/0112450 | A1 * | 5/2007 | Moon et al. | 700/94 |
| 2008/0005225 | A1 * | 1/2008 | Ferguson et al. | 709/203 |

* cited by examiner

*Primary Examiner* — Ahshik Kim

(74) *Attorney, Agent, or Firm* — Muncy, Geissler, Olds & Lowe, PLLC

(57) ABSTRACT

A voice device for use in an automatic vending machine is disclosed to include a card reader for reading a voice file from an inserted electronic card, an input/output module for receiving a control signal from the automatic vending machine, a voice module, and a microprocessor for converting the voice file into a voice signal for output through a voice output device of the voice module subject to the control signal from the automatic vending machine.

8 Claims, 4 Drawing Sheets

VOICE DEVICE FOR AUTOMATIC VENDING MACHINE

BACKGROUND OF THE INVENTION

1. Field of the Invention

The present invention relates to an automatic vending machine and more specifically, to a voice device for use in an automatic vending machine to give a voice instruction, guiding a user to use the automatic vending machine.

2. Description of the Related Art

Following fast development of technology, our mode of living has been changed, and the pace of our life has been accelerated. Nowadays, different automatic vending machines have been creased and are intensively used everywhere to sell different products without serviceman. These automatic vending machines are highly invited for the advantage of saving much labor and bringing convenience to people. For example, a Q-shop has the advantages of scientific intelligence, quick service, and quick finish of payment. A Q-shop may provide automatic vending machines for vending drinks, cigarettes, tickets, ice creams, tickets, memorial coins, key rings, or even hamburgers and noodles. Nowadays, many virtual shops are established to make online shopping, allowing shoppers to shop across millions of products.

Further, more and more numbers of shops utilize automatic vending machines to sell different items for the advantages of saving labor and management cost and raising the profit. However, advanced automatic vending machines provide different added functions and have different operation procedures. The complicated operation procedure of an advanced automatic vending machine brings difficulty and inconvenience to certain users, such as children, aged persons or blind persons. These people may go to a rear shop at a far place to purchase the desired items rather than using advanced automatic vending machines. To an automatic vending machine provider, it is not economic to provide automatic vending machines that cannot attract all consumers.

Therefore, it is desirable to provide a way that facilitates the use of automatic vending machines by a consumer, eliminating all the problems resulted from operation inconvenience and difficulty of automatic vending machines and attracting all consumers to use automatic vending machines.

SUMMARY OF THE INVENTION

The present invention has been accomplished under the circumstances in view. It is therefore one object of the present invention to provide a voice device, which is practical for use in an automatic vending machine to give a voice instruction, guiding a user to operate the automatic vending machine so that a child, old person or blind person can operate the automatic vending machine conveniently and rapidly.

It is another object of the present invention to provide a voice device for use in an automatic vending machine, which can be directly installed in any of a variety of commercially available automatic vending machines without making any change of the internal circuit of the automatic vending machine.

To achieve these and other objects of the present invention, the voice device is used in an automatic vending machine, comprising a microprocessor for signal communication and signal processing, an input/output module, which comprises a connection interface electrically connected to the automatic vending machine for transmitting a control signal from the automatic vending machine to the microprocessor, a card reader, which comprises an insertion slot for the insertion of an electronic card and a connection interface for reading a voice file from the electronic card that is inserted into the insertion slot and transmitting the fetched voice file to the microprocessor for conversion into a voice signal, a voice module electrically connected to said microprocessor and having a voice output device for voice output. The microprocessor receives the voice file read by the connection interface of the card reader from an inserted electronic card and a control signal from the automatic vending machine through the input/output module, and converts the received voice file into a voice signal for output through the voice output device subject to the control of the received control signal.

DETAILED DESCRIPTION OF THE PREFERRED EMBODIMENT

Figure 1:
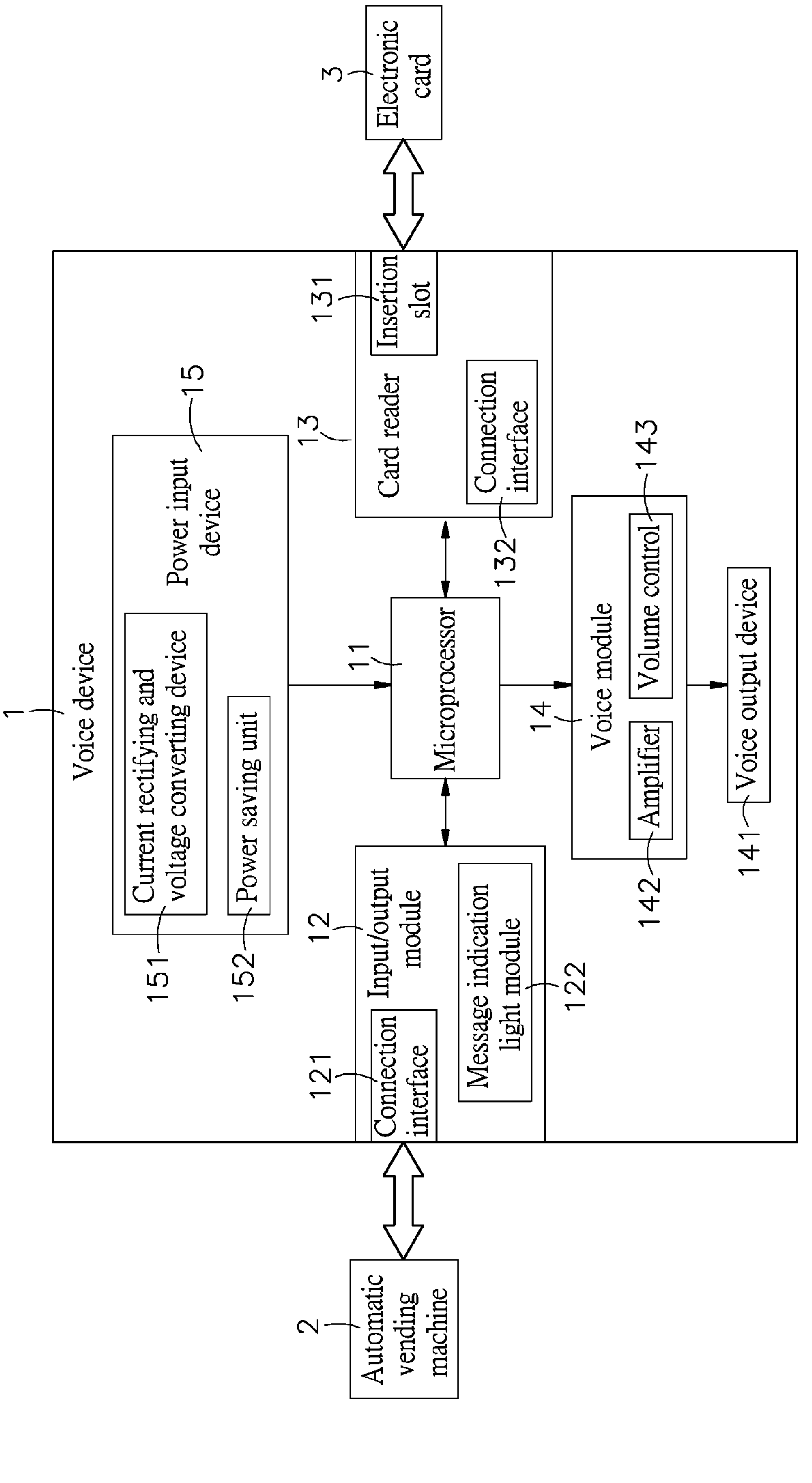
FIG. 1 is a circuit block diagram of a voice device for automatic vending machine in accordance with the present invention.

Referring to FIGS. 1~4, a voice device 1 in accordance with the present invention is shown comprising a microprocessor 11, an input/output module 12, a card reader 13, a voice module 14 and a power input device 15.

The microprocessor 11 is for signal communication and signal processing.

The input/output module 12 is electrically connected to the microprocessor 11, comprising a connection interface 121 and a message indication light module 122. The connection interface 121 can be an interface of CCTalk, RS232, MDB (Multi Drop Bus), Parallel, or any other communication protocol standard. The message indication light module 122 is electrically connected to the connection interface 121, comprising at least one activity light, at least one fault light and at least one status light. LEDs (light emitting diodes are used for the activity light, fault light and status light. The LEDs can be regular LEDs, high-brightness LEDs or laser LEDs of full color design or different colors. The microprocessor 11 controls on/off of the lights of the message indication light module 122 subject to the operation status of the connection interface 121.

The card reader 13 is electrically connected to the microprocessor 11, having an insertion slot 131 for the insertion of an electronic card 3 and a connection interface 132 for reading a voice file from the electronic card 3 that is inserted into the insertion slot 131.

The voice module 14 is electrically connected to the microprocessor 11, comprising a voice output device 141 for voice output, an amplifier 142 for voice signal amplification, and a volume control 143 for regulating the volume of voice to be outputted through the voice output device 141. The microprocessor 11 converts a voice file received from the card reader 13 into a voice signal for output to the voice module 14 subject to a control signal received from the input/output module 12. The voice signal is then amplified by the amplifier 142, and then outputted through the voice output device 141. Further, the voice output device 141 can be a speaker, buzzer or voice synthesizer.

The power input device 15 is electrically connected to the microprocessor 11, comprising a current rectifying and voltage converting device 151 adapted for rectifying input AC and converting it into a DC voltage for the working of the voice device, and a power saving unit 152 that saves the consumption of power supply during a standby mode of the microprocessor 11. An external uninterruptible power supply, power supply module or battery may be used to substitute for the power input device 15.

The aforesaid electronic card 3 insertable into the insertion slot 131 of the card reader 13 can be a CF (Compact Flash Card), MS (Memory Stick Card), SD (Secure Digital Card), MMC (Multi-Media Card), SM (Smart Media Card) or any other data storage card capable of storing a voice file of the operation procedure of the automatic vending machine 2 and readable by the card reader 13. Further, the automatic vending machine 2 can be a beverage, tobacco, ticket, ice cream, memorial keyring, hamburger or noodle vending machine, or any other type of vending machine.

Figure 2:
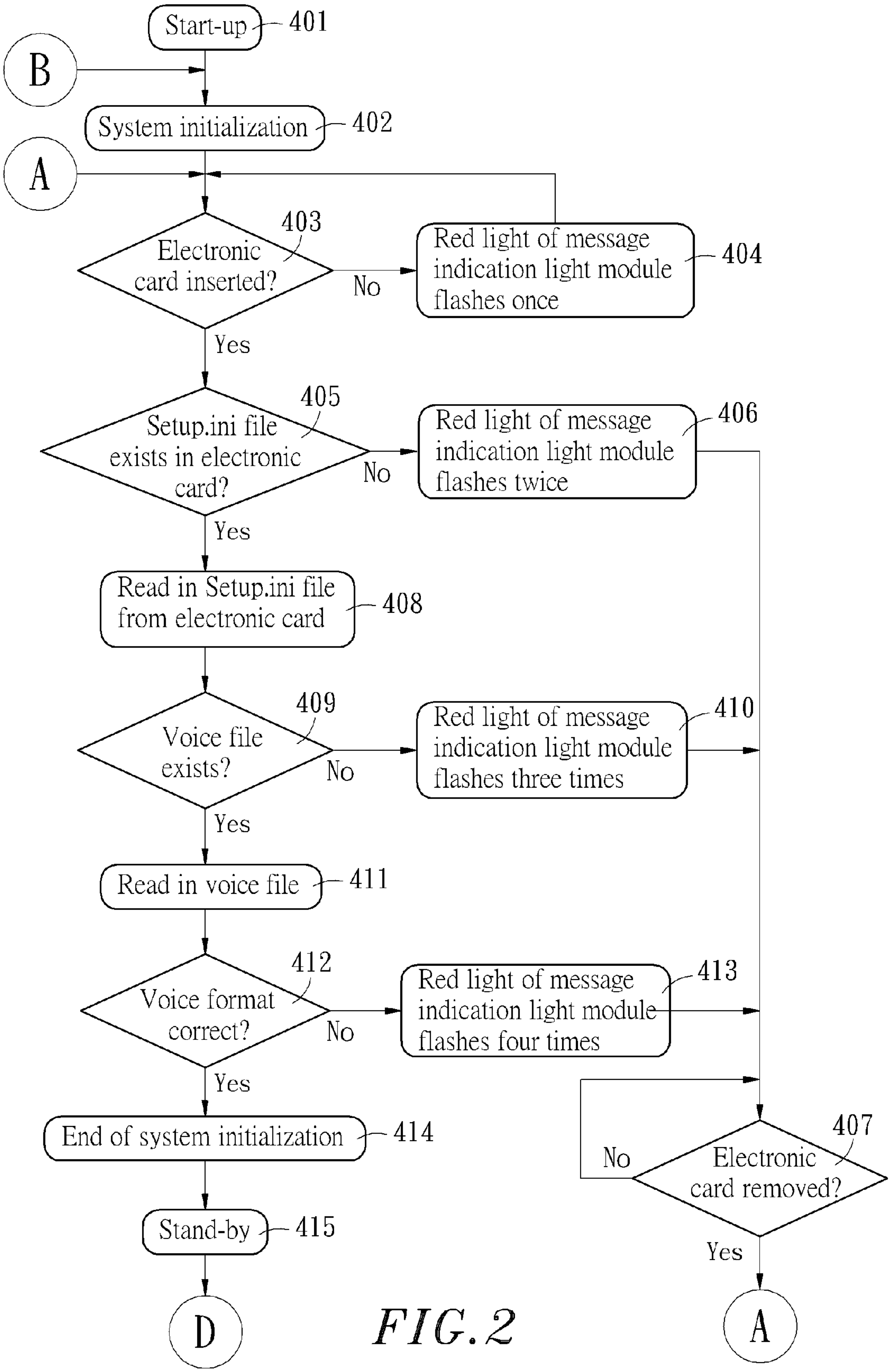
FIG. 2 is an operation flow chart of the present invention (I).
Figure 3:
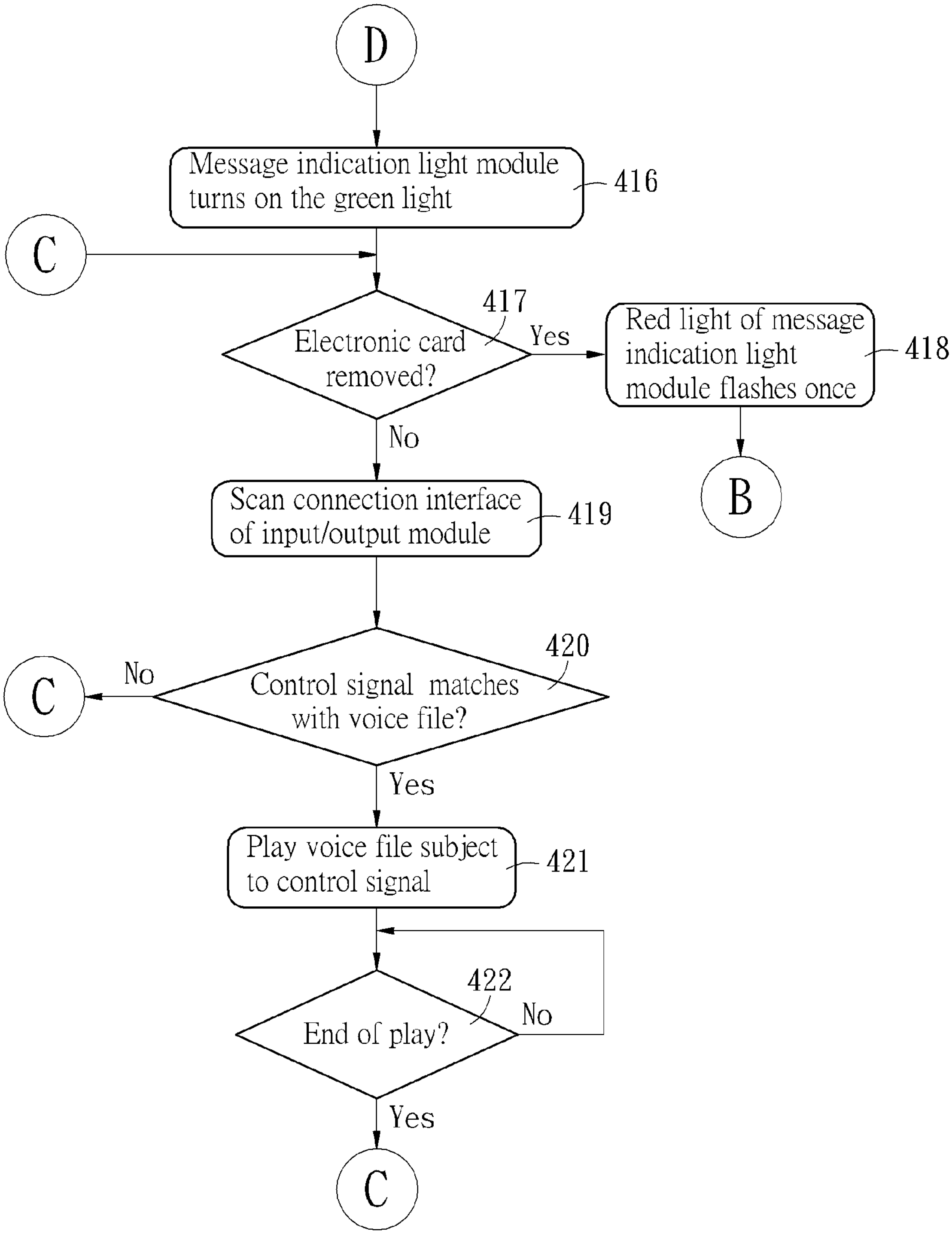
FIG. 3 is an operation flow chart of the present invention (II).
Figure 4:
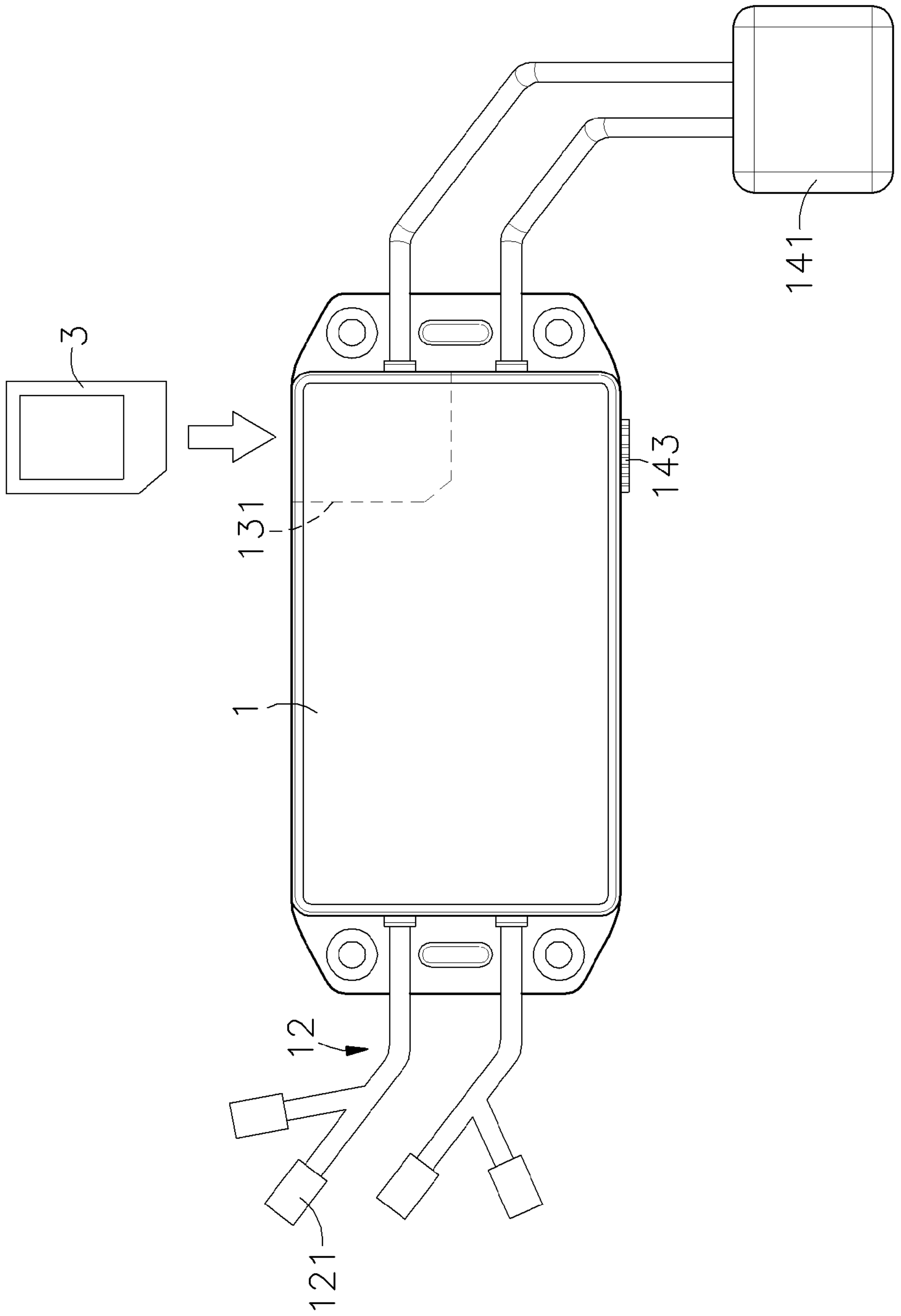
FIG. 4 is a schematic drawing showing the structure of the voice device according to the present invention.

Referring to FIGS. 2 and 3, the operation of the present invention runs subject to the following steps:

(401) Start-up.

(402) System initialized to set up all hardware parameters.

(403) Scan whether or not an electronic card 3 has been inserted into the insertion slot 131 of the card reader? And then proceed to step (405) when positive, or step (404) when negative.

(404) Drive the red light of the message indication light module 122 of the input/output module 12 to flash once, and then return to step (403).

(405) Determine whether or not the electronic card 3 has a Setup.ini file therein? And then proceed to step (408) when positive, or step (406) when negative.

(406) The red light of the message indication light module flashes twice.

(407) Scan whether or not the electronic card 3 has been removed? And then return to step (403) via A, or repeat step (407) till removal of the electronic card 3.

(408) Read in the Setup.ini file from the electronic card 3.

(409) Scan whether or not a voice file exist? And then proceed to step (411) when positive, or step (410) when negative.

(410) Drive the red light of the message indication light module to flash three times, and then return to step (407).

(411) Read in the voice file.

(412) Check whether or not the voice format is correct? And then proceed to step (414) when correct, or step (413) when not correct.

(413) Drive the red light of the message indication light module to flash four times, and then return to step (407).

(414) End system initialization setup.

(415) Stand-by.

(416) The message indication light module gives a green light signal continuously.

(417) Check whether or not the electronic card 3 has been removed? And then proceed to step (418) when positive, or step (419) when negative.

(418) Drive the red light of the message indication light module to flash once, and then return to step (402) via B.

(419) Scan the status of the connection interface 121 (MDB) of the input/output module 12.

(420) Compare whether or not the received control signal and voice file matched? And then proceed to step (421) when positive, or return to step (417) via C when negative.

(421) Play the voice file subject to the control signal.

(422) Determine whether or not the play has been ended, and then return to step (417) via C when negative, or repeat step (422) till the end of the play.

As stated, the voice device 1 of the present invention is installed in an automatic vending machine 2. When the automatic vending machine 2 is started, the voice device is initialized to set up all hardware parameters. At the same time, the voice device 1 automatically checks whether or not an electronic card 3 has been inserted into the insertion slot 131 of the card reader 13. When the insertion slot 131 is empty, the microprocessor 11 controls the message indication light module 122 of the input/output module 12 to flash the red light once, and scans the insertion slot 131 continuously till the insertion of an electronic card 3. When an electronic card 3 is detected in the insertion slot 131, the microprocessor 22 scans whether or not the electronic card 3 has installed therein a setup.ini file. If the inserted electronic card 3 does not have a setup.ini file, the microprocessor immediately drives the message indication light module 122 of the input/output module 12 to flash the red light twice, telling the user to remove the incorrect electronic card and to insert a correct electronic card 3. Immediately after removal of the wrong electronic card, the microprocessor 11 returns to step (403) to scan the insertion status of the insertion slot 131 of the card reader 13. When an electronic card 3 that has installed therein a setup.ini file is inserted into the insertion slot 131 and scanned by the microprocessor 11, the microprocessor 11 checks whether or not a voice file exist in the electronic card 3. If the electronic card 3 does not have a voice file, the microprocessor 11 immediately drives the message indication light module 122 of the input/output module 12 to flash the red light three times, giving a visual error signal. Immediately after removal of the wrong electronic card, the microprocessor 11 returns to step (403) to scan the insertion status of the insertion slot 131 of the card reader 13. If an electronic card 3 that is inserted into the insertion slot 131 is scanned to have a voice file therein, the microprocessor immediately reads in the voice file and checks the voice format. If the voice format is not matched, the microprocessor 11 immediately drives the message indication light module 122 of the input/output module 12 to flash the red light four times, giving a visual error signal. Immediately after removal of the wrong electronic card, the microprocessor 11 returns to step (403) to scan the insertion status of the insertion slot 131 of the card reader 13. When an electronic card 3 that has the correct voice format therein is detected, the system initialization step is ended, and the voice device 1 immediately enters the stand-by mode, and at the same time the microprocessor 11 drives the message indication light module 122 of the input/output module 12 to turn on the green light, giving a message of normal.

Thereafter, the microprocessor 11 scans the communication and handling status of the connection interface 121 (MDB) of the input/output module 12 with the automatic vending machine 2. When a user operates the buttons of the control panel of the automatic vending machine 2, a corresponding control signal is produced and inputted into the microprocessor 11 through the connection interface 121 of the input/output module 12. The microprocessor 11 compares the control signal and the voice file received from the card reader 13 to check whether or not they are matched? When not matched, the microprocessor 11 immediately returns to step (417). When matched, the microprocessor 11 immediately converts the voice file into a voice signal that is then amplified by the amplifier 142 and then outputted through the voice output device 141 subject to the volume control 143.

As stated above, the invention provides a voice device 1 for installation in an automatic vending machine 2. The voice device 1 comprises a microprocessor 11 for signal communication and signal processing, a card reader 13 that has an insertion slot 131 for the insertion of an electronic card 3 and a connection interface 132 for reading in a voice file from the inserted electronic card 3, an input/output module 12 electrically connected with the automatic vending machine 2 for enabling the microprocessor 11 to receive a control signal from the automatic vending machine 2 for controlling output of the voice file received from the inserted electronic card 3, a voice module 14 for amplifying the voice signal that is converted from the voice file of the inserted electronic card 3 by the microprocessor 11 and regulating the voice volume of the amplified voice signal, a voice output device 141 for output of the voice signal, and a power input device 15 that provides the voice device 1 with the necessary working voltage. When a user uses the automatic vending machine 2, the voice device 1 gives a voice indication. Following up the voice instruction, a user can operate the automatic vending machine 2 conveniently and correctly.

In conclusion, the invention provides the following features and advantages:

1. Subject to the control of a control signal inputted into the automatic vending machine 2 by a user, the microcontroller 11 converts the voice file of an electronic card 3 inserted by the user into a voice signal for output through a voice output device 141. Following up the voice instruction, a child, old person, or blind person can operate the automatic vending machine 2 conveniently and rapidly.

2. The connection interface 121 is compatible to commercially available automatic vending machines, and therefore the voice device of the present invention can be used in any existing automatic vending machine without making any modification of the internal circuit design of the automatic vending machine, saving much installation cost.

3. The insertion slot 131 of the card reader 13 is provided for the insertion of an electronic card 3 for enabling the connection interface 132 to read in storage voice files from the electronic card 3. The voice files can be pre-recorded voice or sound, such as “Select the item to purchase”, “Input the quantity to purchase”, “Take your purchased item”, . . . and etc. By means of this voice instruction, a user can conveniently operate the automatic vending machine. Further, an electronic card 3 compatible to the voice device 1 has the characteristics of small size, high storage capacity and high mobility. The voice files can be of any of a variety of different languages so that the voice device 1 can be used with any of a variety of automatic vending machines 2 in any country around the world.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A voice device used in an automatic vending machine and adapted to give a voice instruction for operating said automatic vending machine subject to a control signal inputted into said automatic vending machine by a user, the voice device comprising:

a microprocessor for signal communication and signal processing;

an input/output module electrically connected to said microprocessor, said input/output module comprising a connection interface electrically connected to said automatic vending machine for transmitting a control signal from said automatic vending machine to said microprocessor;

a card reader electrically connected to said microprocessor, said card reader comprising an insertion slot for the insertion of an electronic card, and a connection interface for reading a voice file from the electronic card that is inserted into said insertion slot and transmitting the voice file to said microprocessor for conversion into a voice signal;

a voice module electrically connected to said microprocessor, said voice module comprising a voice output device for voice output;

wherein said microprocessor receives the voice file read by the connection interface of said card reader from an inserted electronic card and a control signal from said automatic vending machine through said input/output module, and converts the received voice file into a voice signal for output through said voice output device subject to the received control signal.

2. The voice device as claimed in claim 1, further comprising a power input device electrically connected to said microprocessor to provide the necessary working voltage.

3. The voice device as claimed in claim 2, wherein said power input device comprises a current rectifying and voltage converting device adapted for converting an input AC power source into a DC power source, and a power saving unit that saves the consumption of power supply during a standby mode of said microprocessor.

4. The voice device as claimed in claim 1, wherein the connection interface of said input/output module is selected from the interface group of CCTalk, RS232, MDB (multidrop bus) and Parallel communication protocol standards.

5. The voice device as claimed in claim 1, wherein said input/output module comprises a message indication light module, said message indication light module comprising at least one activity light, at least one fault light and at least one status light, said at least one activity light, at least one fault light and at least one status light being formed of light emitting diodes.

6. The voice device as claimed in claim 1, wherein said voice module comprises an amplifier for signal gain amplification, and a volume control for regulating the voice volume of the voice signal to be outputted through said voice output device.

7. The voice device as claimed in claim 1, wherein said voice output device is selected from a group of speaker, buzzer and voice synthesizer.

8. The voice device as claimed in claim 1, wherein said insertion slot of said card reader is compatible to CF (Compact Flash Card), MS (Memory Stick Card), SD (Secure Digital Card), MMC (Multi-Media Card) and SM (Smart Media Card) specifications.

* * * * *